(12) United States Patent
Schmidt

(10) Patent No.: US 10,688,460 B2
(45) Date of Patent: Jun. 23, 2020

(54) DEVICE FOR MIXING AND METERING AT LEAST TWO GASES

(71) Applicant: AC Aircontrols GmbH, Kempen (DE)

(72) Inventor: Hans Georg Schmidt, Oberhausen (DE)

(73) Assignee: AC Aircontrols GmbH, Kempen (DE)

( * ) Notice: Subject to any disclaimer, the term of this patent is extended or adjusted under 35 U.S.C. 154(b) by 139 days.

(21) Appl. No.: 15/977,909

(22) Filed: May 11, 2018

(65) Prior Publication Data

US 2018/0257053 A1     Sep. 13, 2018

Related U.S. Application Data

(63) Continuation of application No. PCT/DE2016/000373, filed on Oct. 15, 2016.

(30) Foreign Application Priority Data

Nov. 11, 2015   (DE) .......................... 10 2015 014 529

(51) Int. Cl.
*B01F 15/04* (2006.01)
*B01F 3/02* (2006.01)
(Continued)

(52) U.S. Cl.
CPC ............ *B01F 15/0429* (2013.01); *B01F 3/02* (2013.01); *F16K 11/0655* (2013.01);
(Continued)

(58) Field of Classification Search
CPC ....... Y10T 137/2567; Y10T 137/87161; Y10T 137/87692; B01F 15/0429; F16K 11/0655; G05D 11/03
(Continued)

(56) References Cited

U.S. PATENT DOCUMENTS 1,077,881 A * 11/1913 Higgins, Jr. ............. F02M 1/00
                                                              123/25 A
2,097,397 A * 10/1937 Heinrich ............... F23D 14/465
                                                              137/595
(Continued)

FOREIGN PATENT DOCUMENTS

DE           2341585 A1    4/1974
DE   10 2015 014 529 B3    9/2016
EP           0066573 B1   11/1985

*Primary Examiner* — William M McCalister
(74) *Attorney, Agent, or Firm* — Muncy, Geissler, Olds & Lowe, P.C.

(57) ABSTRACT

A device for mixing and metering of at least two gases, comprising two bodies that can be displaced relative to each other, wherein margins of the bodies are in contact with one another and between these margins at least two rectangular openings for one gas each can be formed, wherein a displacement of the bodies relative to each other automatically causes an increase of one opening and a decrease of the other opening, wherein the resulting total cross-section of the openings remains constantly the same here. Moreover, the device comprises a control element which is arranged adjacent to the two bodies and in contact therewith, wherein the control element can be translationally displaced in a continuous manner between a closed position and an open position in order to close or to open the openings.

15 Claims, 14 Drawing Sheets

(51) Int. Cl.
*F16K 11/065* (2006.01)
*G05D 11/03* (2006.01)

(52) U.S. Cl.
CPC ....... *G05D 11/03* (2013.01); *Y10T 137/87161* (2015.04); *Y10T 137/87692* (2015.04)

(58) Field of Classification Search
USPC .......................................... 137/112, 595, 607
See application file for complete search history.

(56) References Cited

U.S. PATENT DOCUMENTS

| | | | | |
|---|---|---|---|---|
| 2,708,093 A * | 5/1955 | Leber | .................. | F16K 35/16 |
| | | | | 251/58 |
| 4,150,684 A | 4/1979 | Kervin | | |
| 4,467,834 A | 8/1984 | Rochat et al. | | |
| 5,070,906 A * | 12/1991 | Orlandi | ................ | F16K 11/161 |
| | | | | 137/606 |
| 5,941,270 A * | 8/1999 | Nogle | ................ | F16H 61/0276 |
| | | | | 137/112 |
| 7,143,786 B2 * | 12/2006 | Romero | ................ | F16K 3/08 |
| | | | | 137/606 |
| 2009/0032116 A1 * | 2/2009 | Bock | ................ | F16K 11/02 |
| | | | | 137/513 |
| 2018/0257053 A1 * | 9/2018 | Schmidt | ............ | F16K 11/0655 |

\* cited by examiner

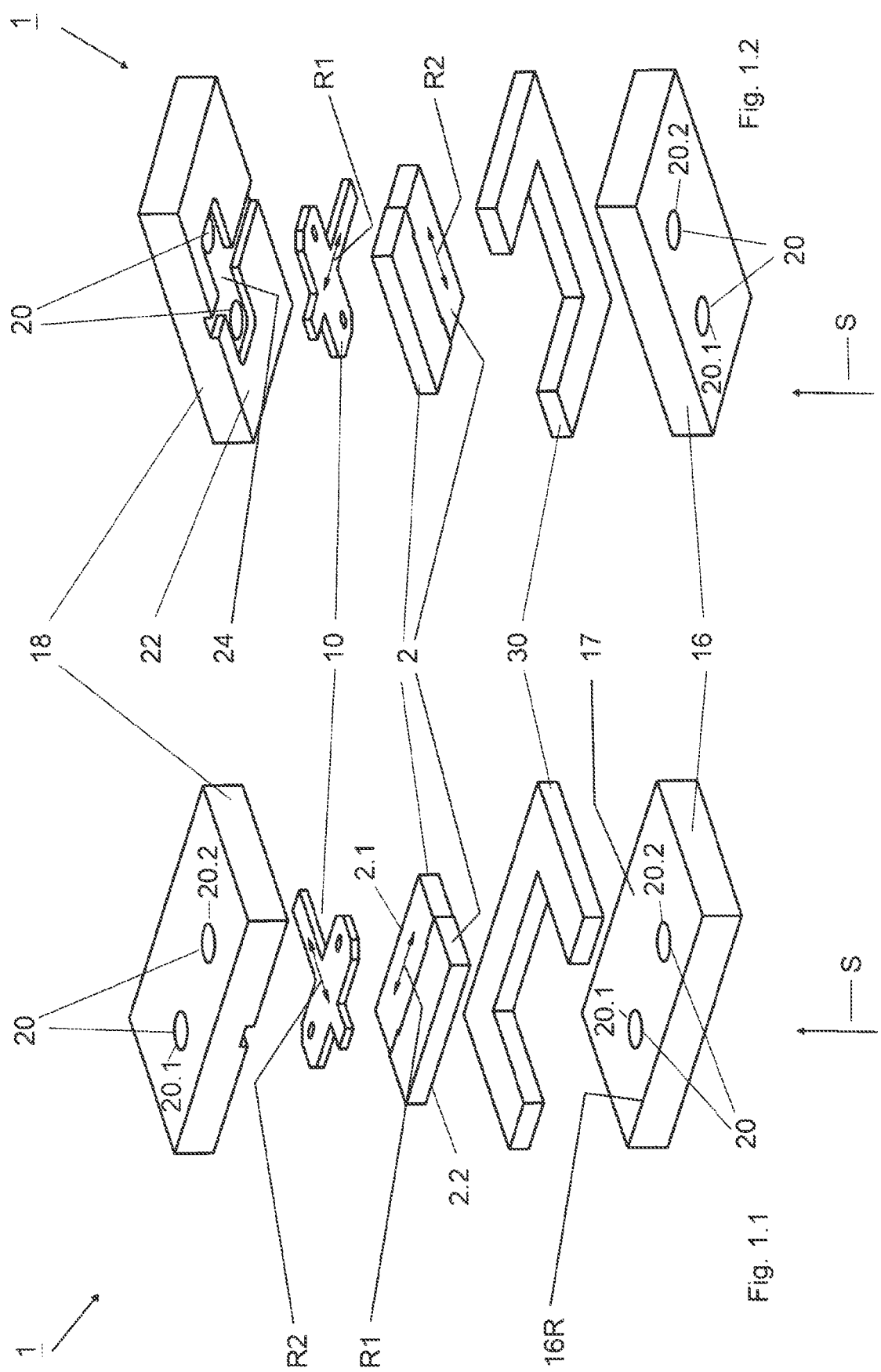

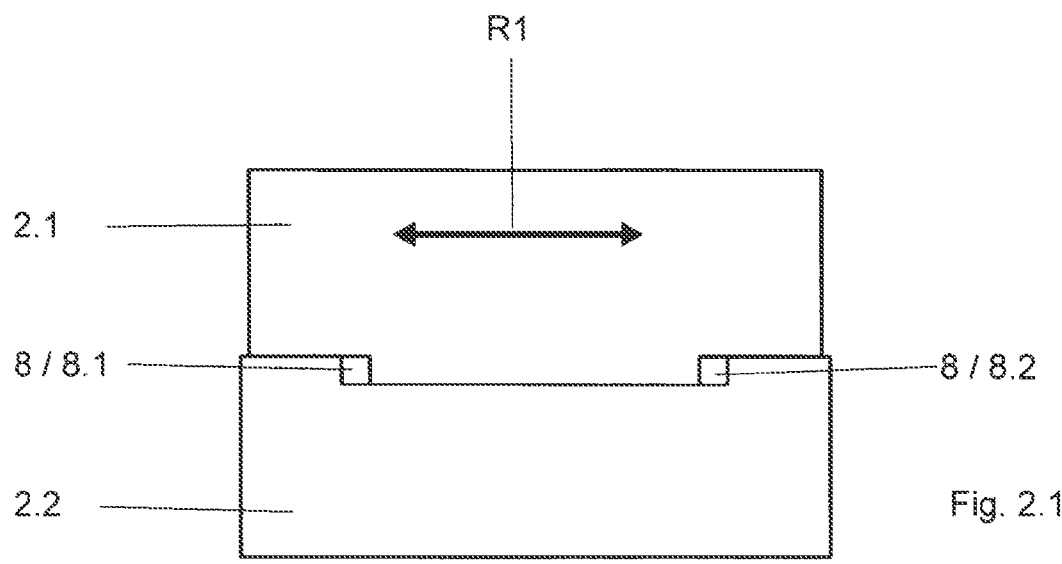
Fig. 2.1
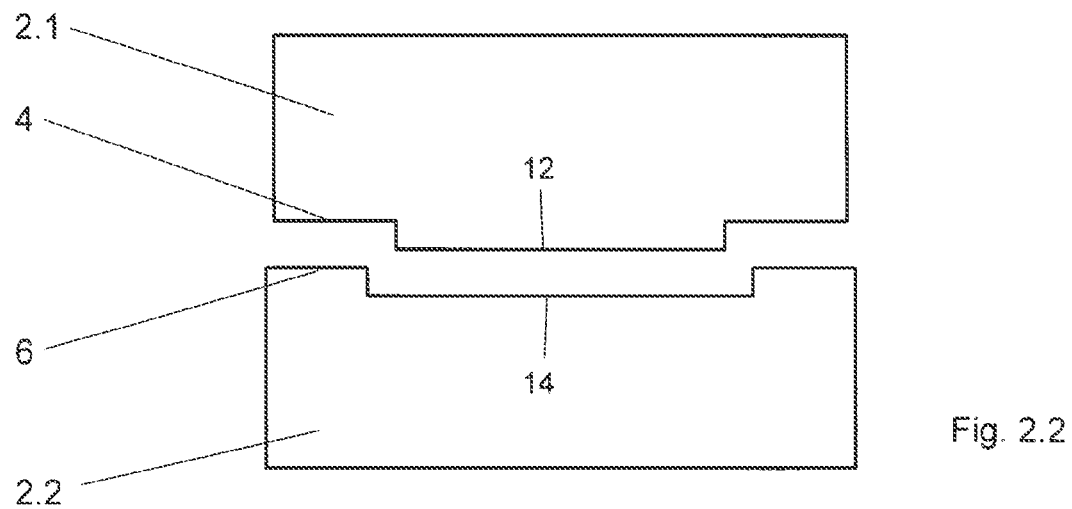
Fig. 2.2

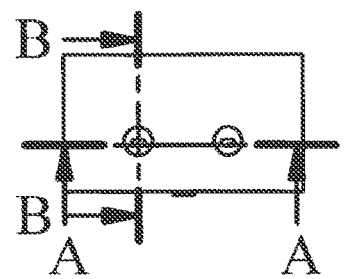
Fig. 4.1
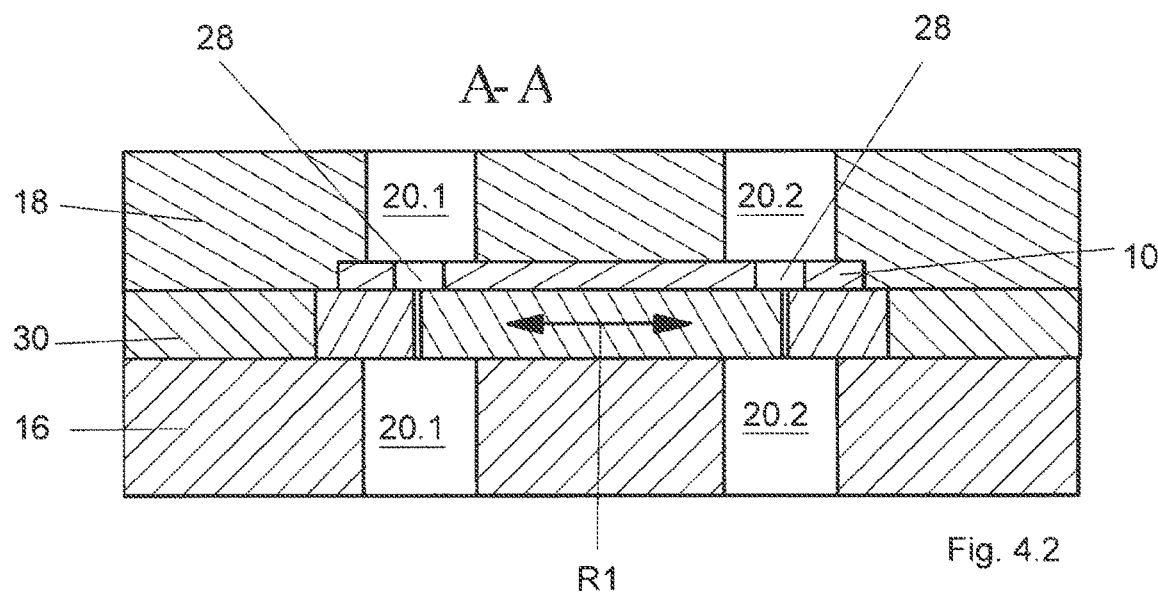
Fig. 4.2
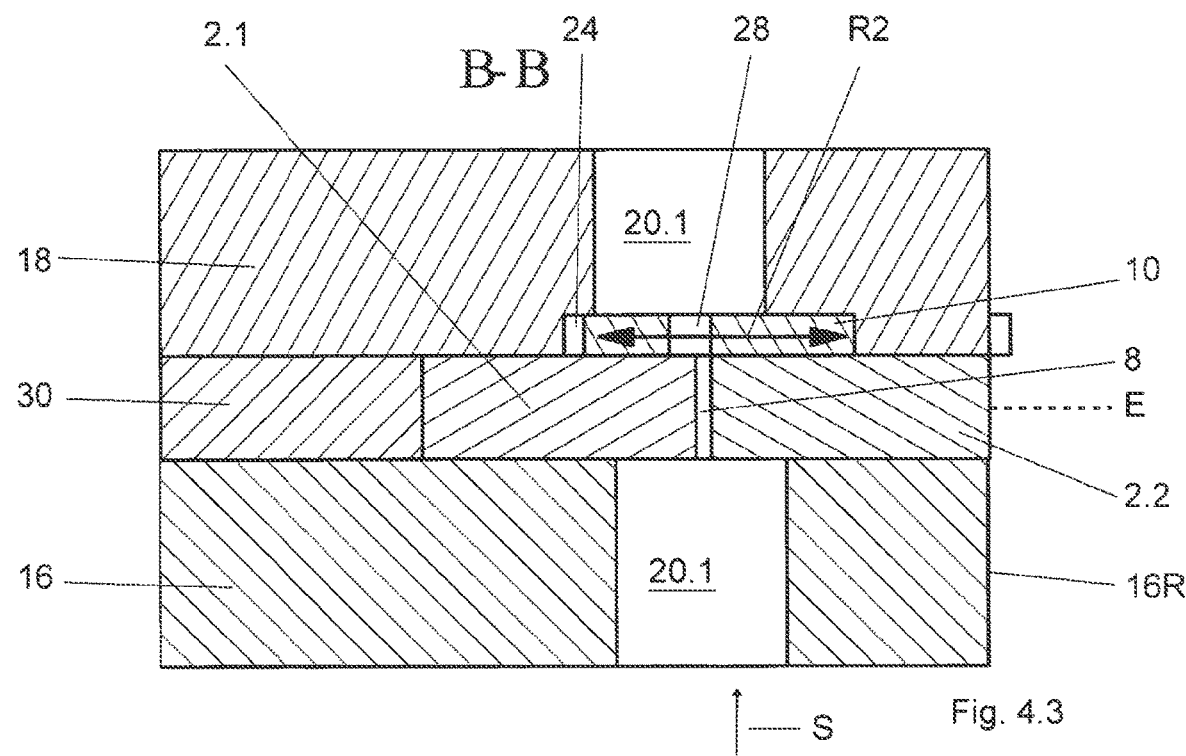
Fig. 4.3

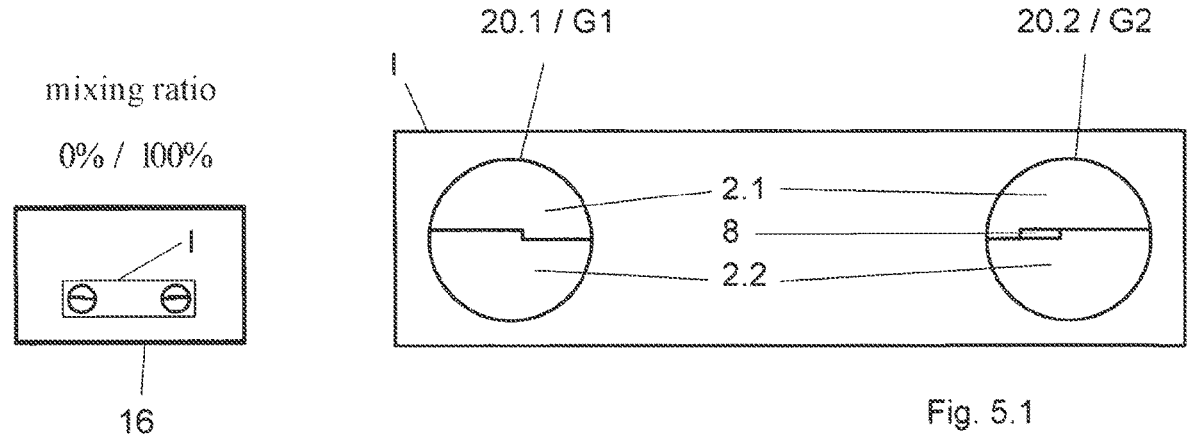
Fig. 5.1
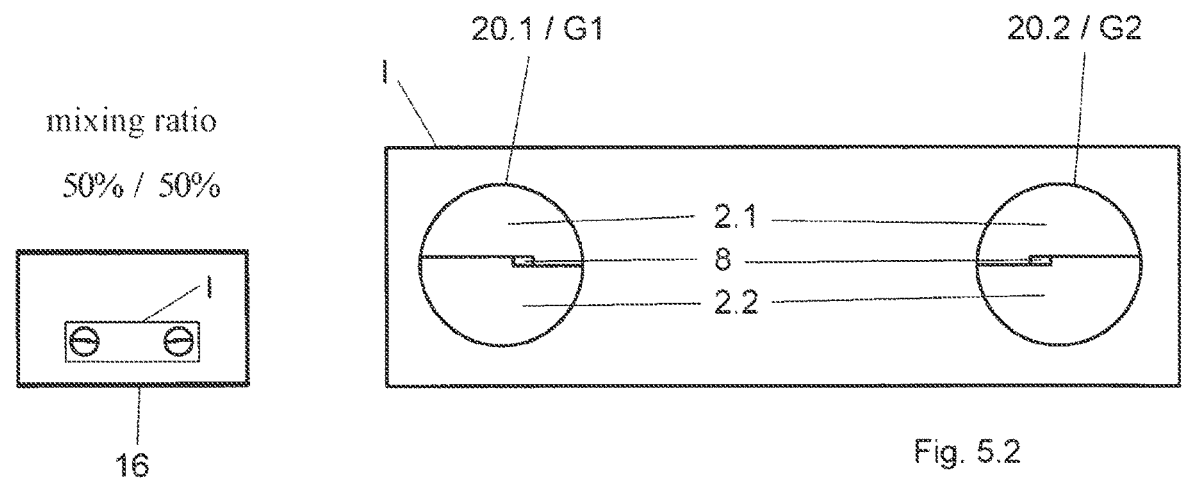
Fig. 5.2
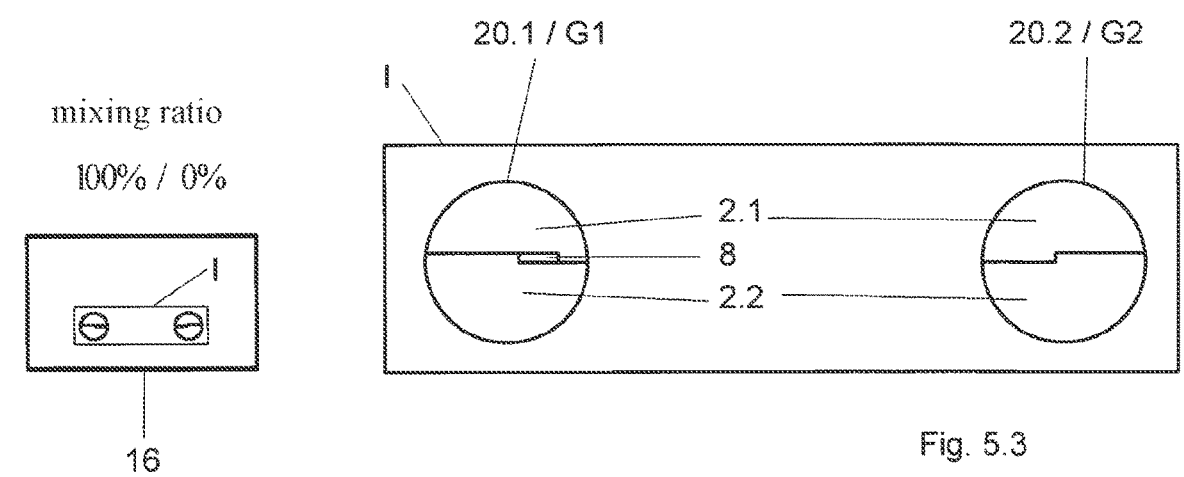
Fig. 5.3

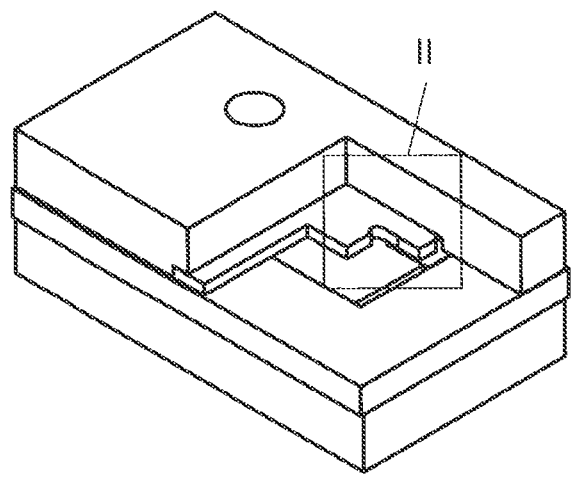
Fig. 6.1
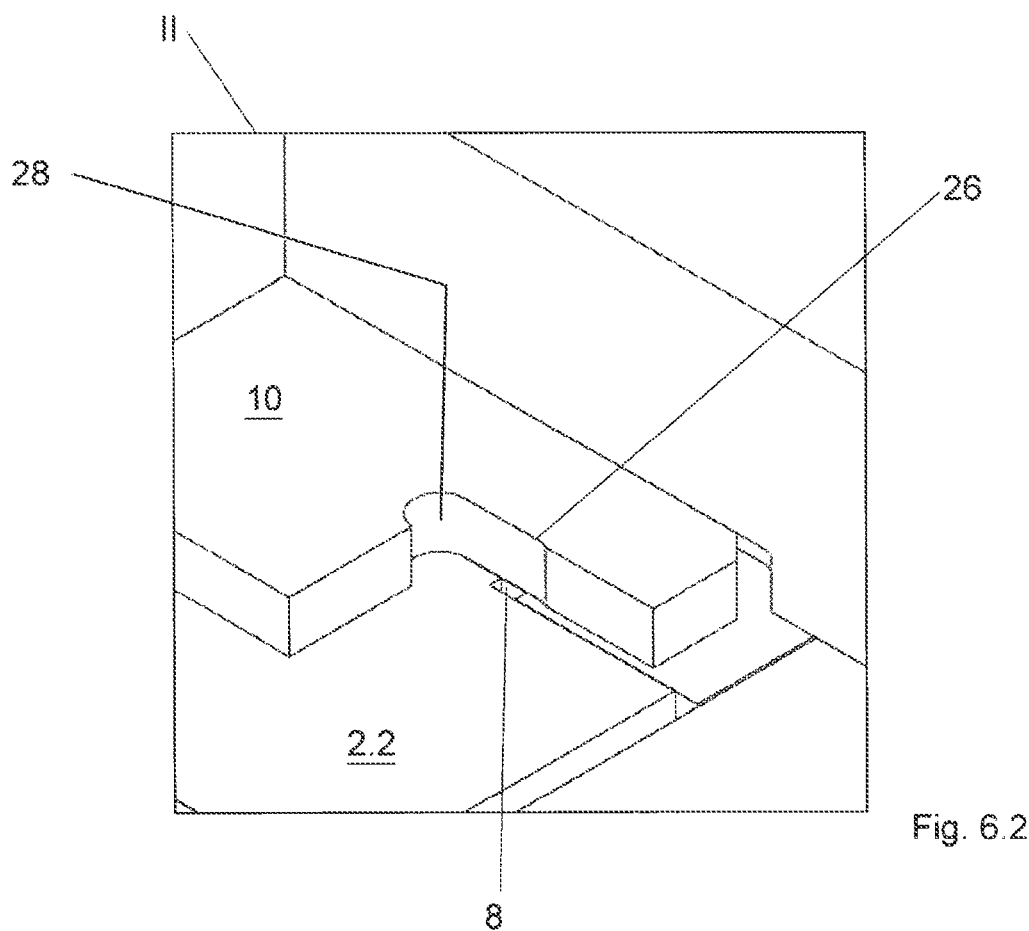
Fig. 6.2 mixing ratio 50% / 50%
flow 0%
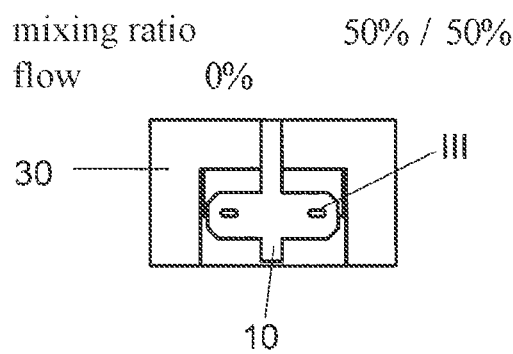
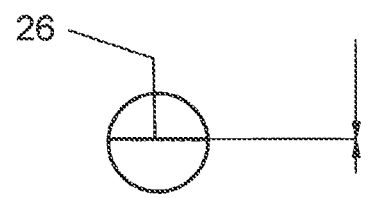
Fig. 7.1
mixing ratio 50% / 50%
flow 50%
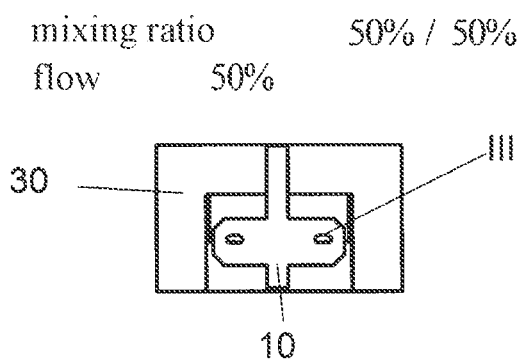
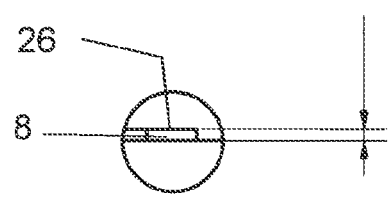
Fig. 7.2
mixing ratio 50% / 50%
flow 75%
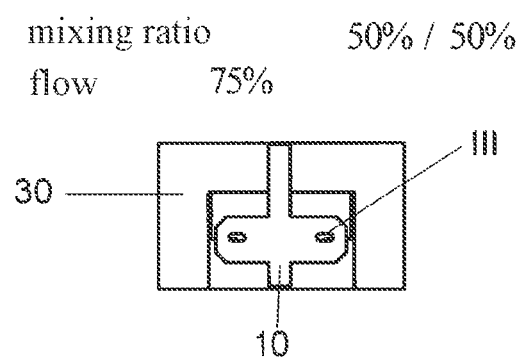
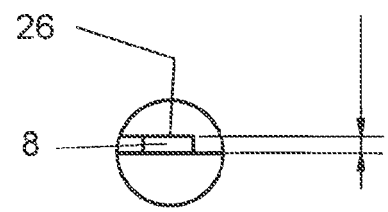
Fig. 7.3
mixing ratio 50% / 50%
flow 100%
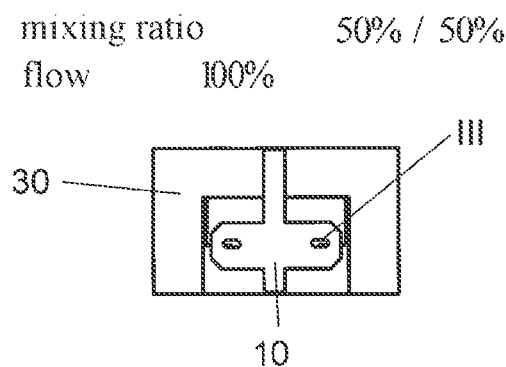
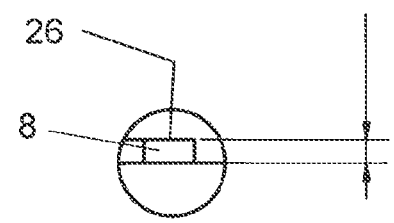
Fig. 7.4

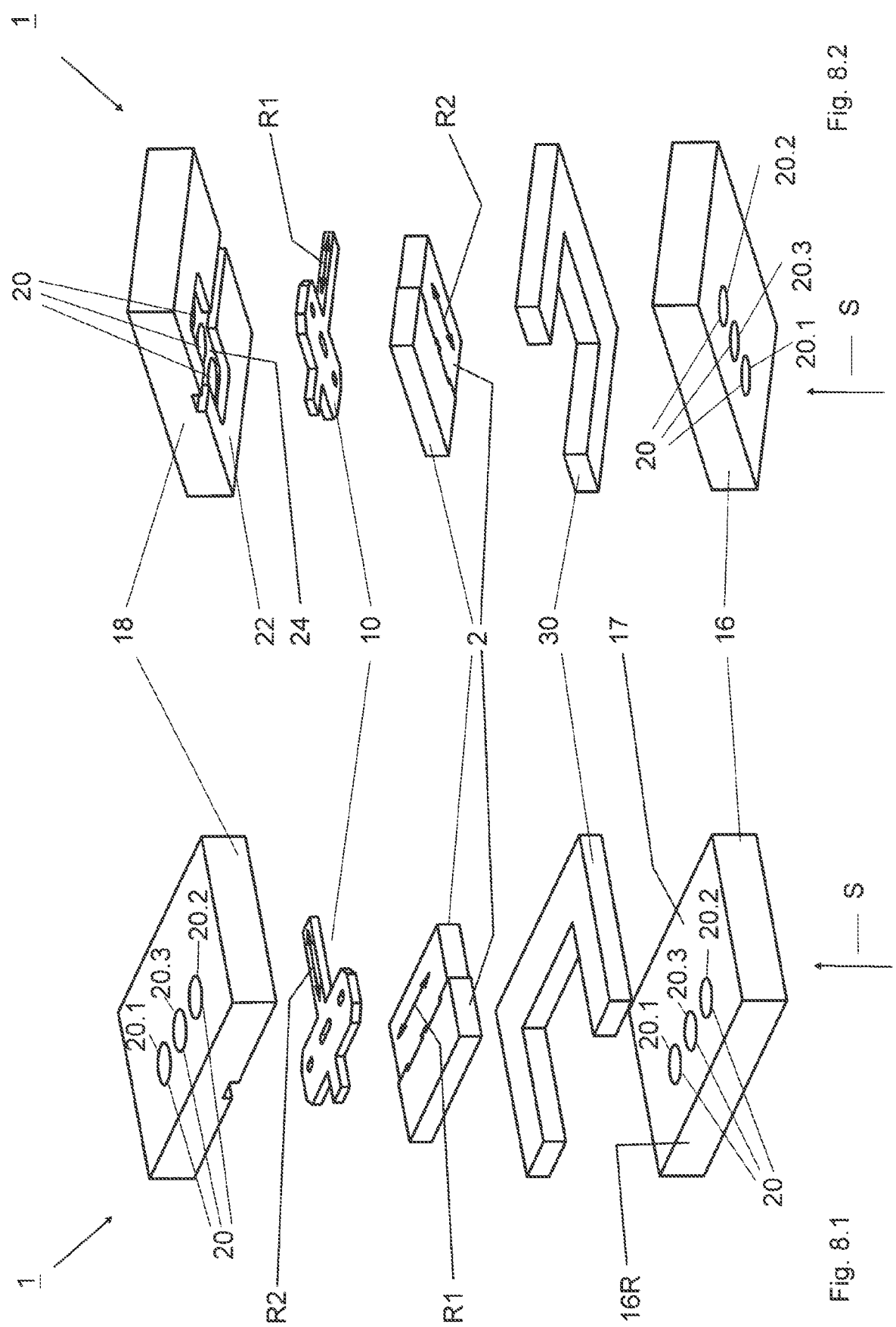

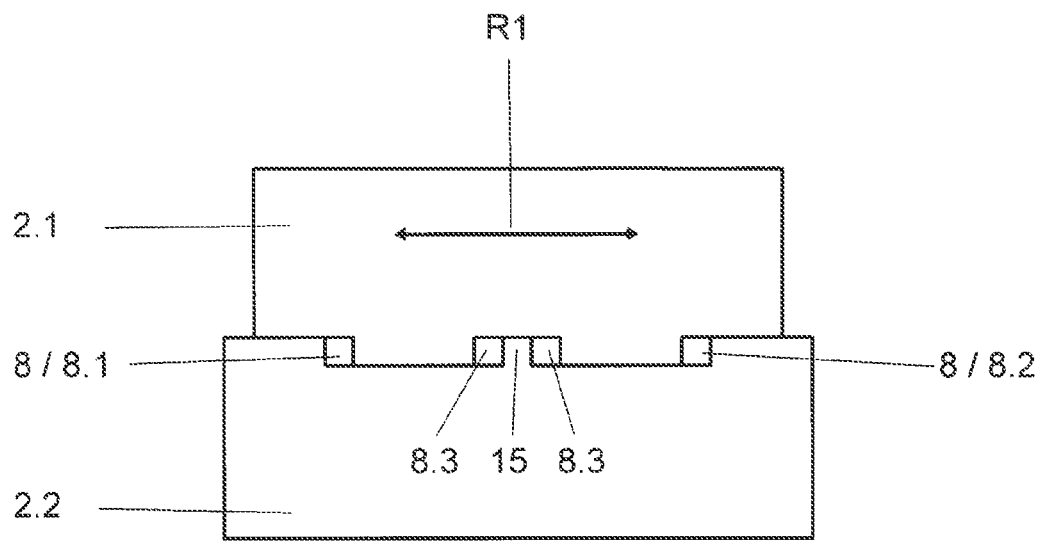
Fig. 9.1
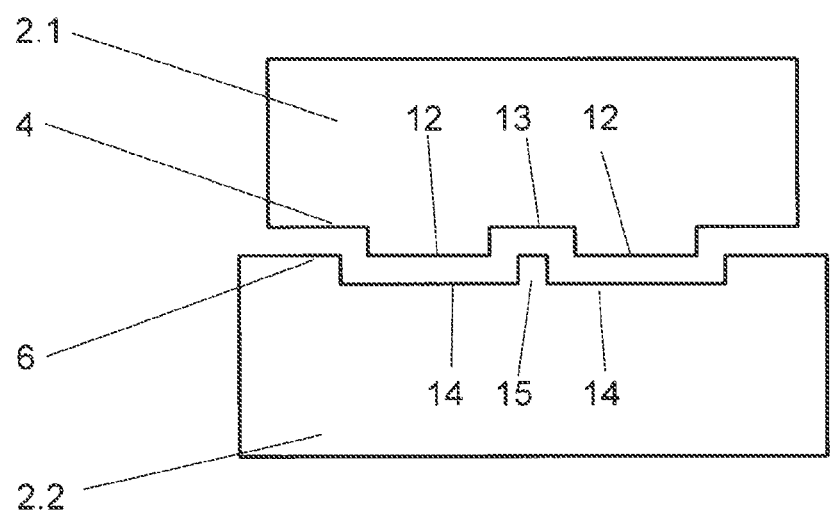
Fig. 9.2

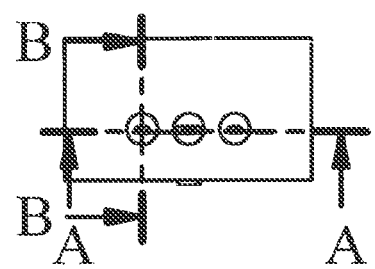
Fig. 11.1
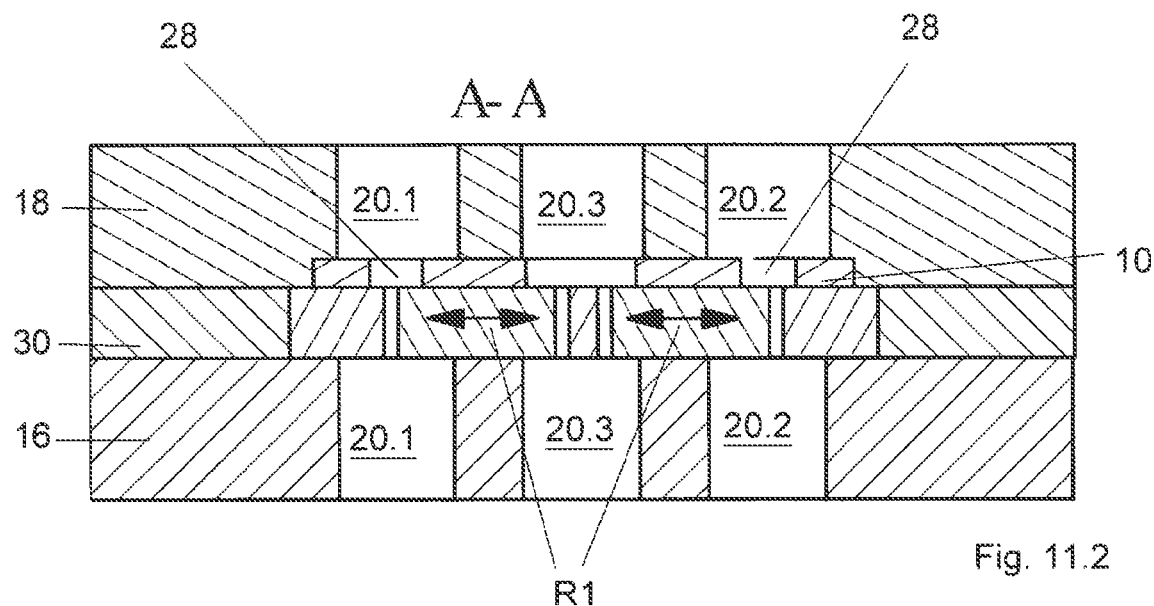
Fig. 11.2
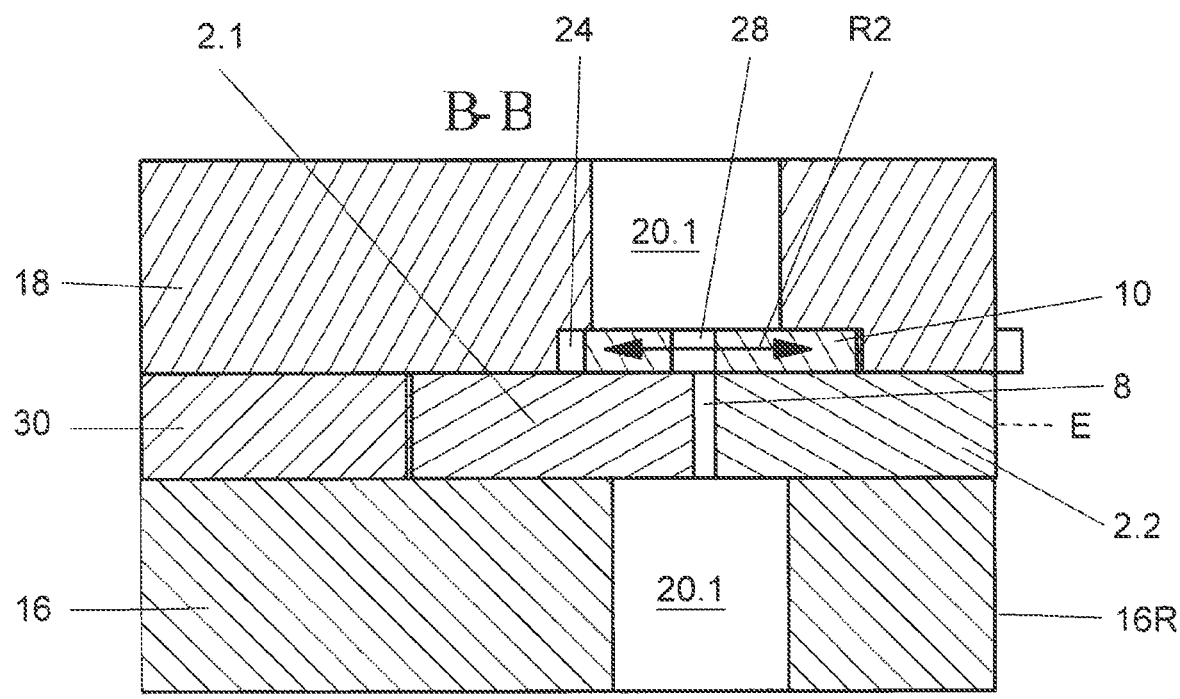
Fig. 11.3

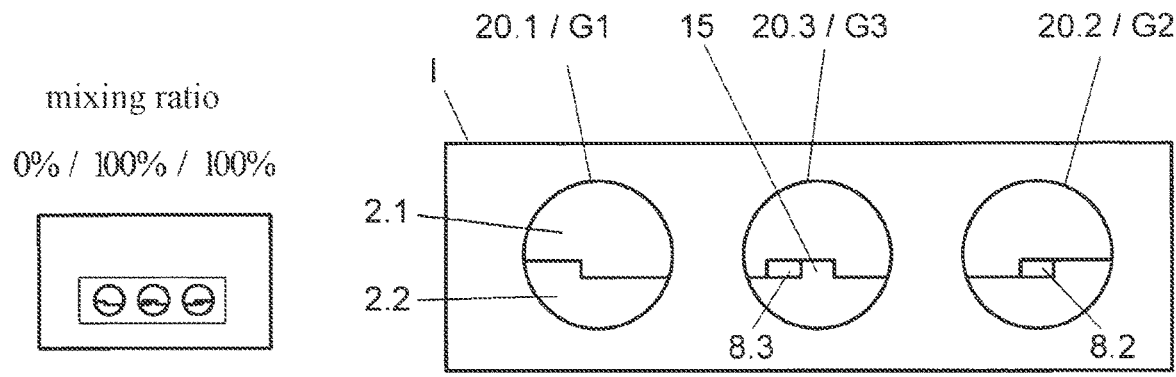
Fig. 12.1
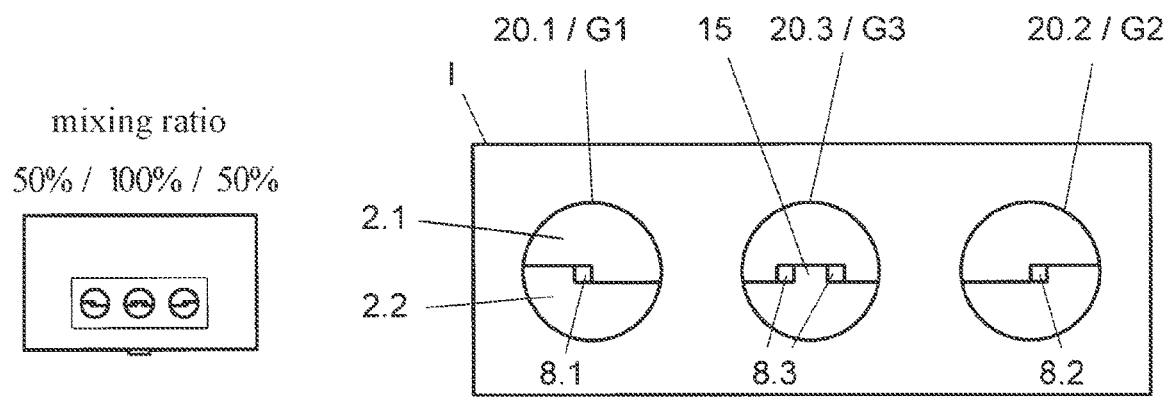
Fig. 12.2
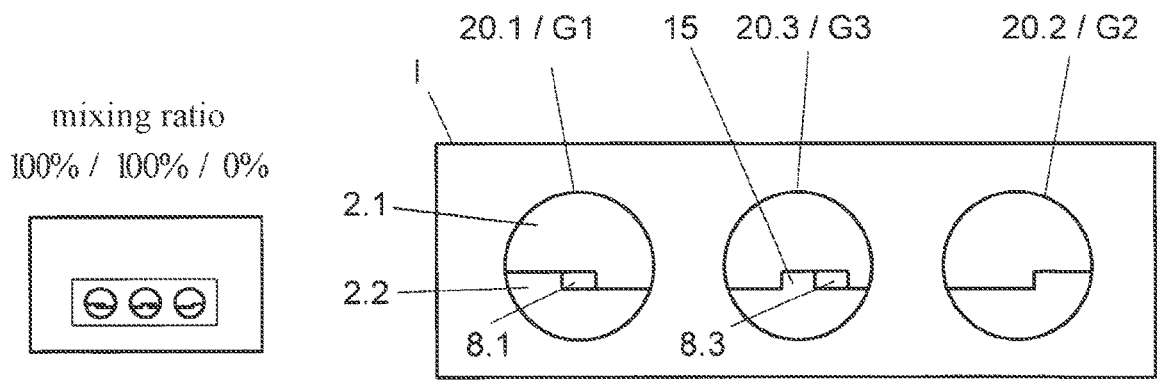
Fig. 12.3

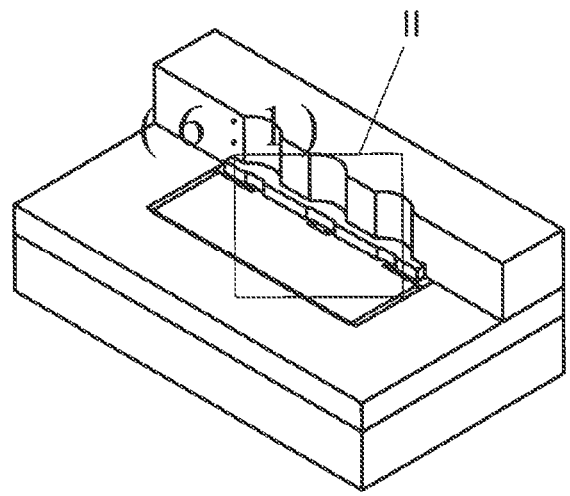
Fig. 13.1
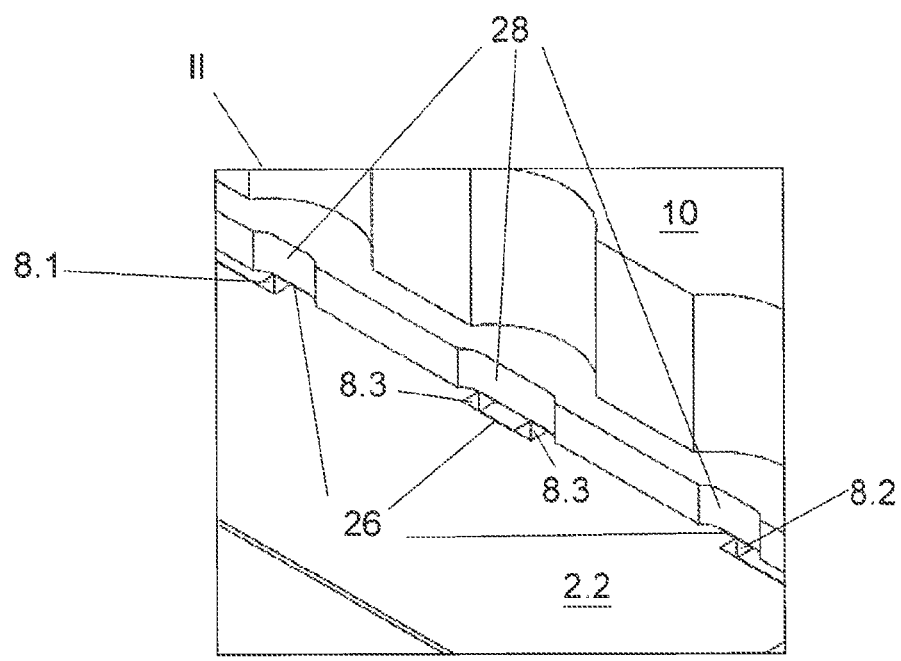
Fig. 13.2

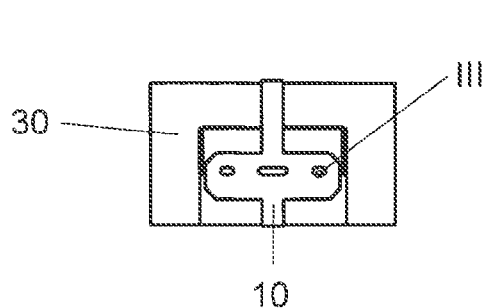
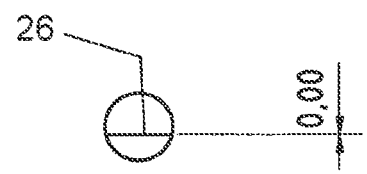
Fig. 14.1
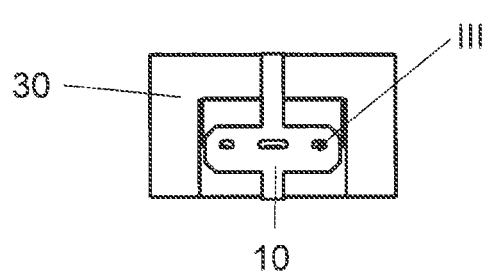
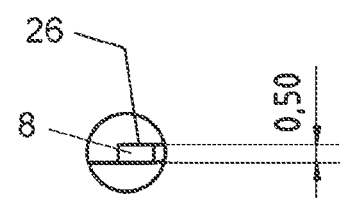
Fig. 14.2
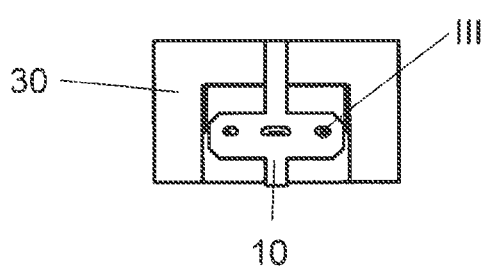
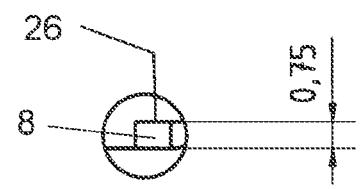
Fig. 14.3
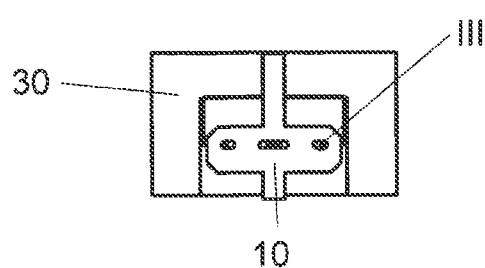
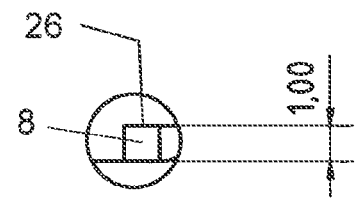
Fig. 14.4

DEVICE FOR MIXING AND METERING AT LEAST TWO GASES

This nonprovisional application is a continuation of International Application No. PCT/DE2016/000373, which was filed on Oct. 15, 2016, and which claims priority to German Patent Application No. DE 10 2015 014 529.0, which was filed in Germany on Nov. 11, 2015, and which are both herein incorporated by reference.

BACKGROUND OF THE INVENTION

Field of the Invention

The present invention relates to a device for mixing and metering of at least two gases.

Description of the Background Art

For different applications, in particular in the field of medical engineering, there exists a demand for mixing a plurality of gases in a predetermined mixing ratio, wherein the gases in the predetermined mixing ratio are then supplied e.g. to a patient. A device for controlled mixing of gases is, e.g., known from DE 21 34 871 C2, which corresponds to U.S. Pat. No. 3,727,627. In this device, a pressure change during mixing of the gases is not made proportionally so that therefore a membrane technology with pressure regulating stages connected in series is required. Additional devices are required for metering of the gases following their mixing.

According to the known prior art, EP 66 573 B1, which corresponds to U.S. Pat. No. 4,467,834, there is shown a device of the generic type for controlling of the mixture and the flow rate of at least two fluids. Here, mixing and metering of at least two gases is realized purely mechanically, wherein in a body for passing gases two passages are formed which are covered by a closing plate in which two rectangular openings are formed. The closing plate can be displaced both in horizontal and in vertical direction relative to the body, wherein the rectangular openings formed in the closing plate are caused to overlap the passages formed in the body. Depending on the adjusted overlapping of the rectangular openings with the passages, with respect to the gases which are passed through the passages of the body, either their mixing ratio or their flow through the body can be changed. This is realized by a horizontal and/or vertical displacement of the closing plate relative to the body, wherein modification of one control system for mixing the gases does not affect the other control system for metering.

In the device according to EP 66 573 B1, mixing and metering of the gases is adjusted by the closing plate explained above, namely by its horizontal and/or vertical displacement relative to the body in which the passages for the gases are formed. The disadvantage is here that a displacement of the closing plate for mixing of the gases can also influence metering of the gases, and vice versa. Further, accuracy of the control of mixing and metering depends for this device on the rectangular openings which are formed in the closing plate.

SUMMARY OF THE INVENTION

It is therefore an object of the present invention to provide a device for mixing and metering of gases in which a high-precision and reliable mixing and metering of gases is possible with mechanically simple and cost-effective means.

A device according to the present invention serves for mixing and metering of at least two gases and comprises a component that can be displaced, wherein the direction of movement of the device for mixing of the gases and the direction of movement of the device for metering of the gases are vertical to each other. Here, the device for mixing of the gases are formed by two bodies that can be displaced relative to each other, which are arranged next to each other in a common plane extending parallel to the flow direction of the gases, wherein margins of the bodies are in contact with one another and between these margins at least two rectangular openings for one gas each can be formed. A displacement of the bodies relative to each other in a first direction of movement, which extends parallel to the margins of the bodies, automatically causes an increase of one opening and a decrease of the other openings, wherein the resulting total cross-section of the openings remains constant. The device for metering of the gases are formed by a control element which is arranged adjacent to the two bodies and in contact therewith, wherein the control element can be translationally displaced in a continuous manner in a second direction of movement vertically to the first direction of movement between a closed position, in which the openings, which can be formed between the bodies, are entirely covered by the control element and thus closed, and an open position, in which the openings, which can be formed between the margins of the bodies, are entirely opened.

The invention is based on the important finding that the device for mixing of the gases and the device for metering of the gases are formed by mechanically separate elements, namely on the one hand by the bodies displaceable relative to each other in the first direction of movement (for mixing of the gases), between the margins of which the rectangular openings for one gas each can be formed, and on the other hand by the control element (for metering of the gases), which can be displaced in a continuous manner in the second direction of movement, extending vertically to the first direction of movement, between the closed position and the open position mentioned, whereby the free opening cross-section for the openings between the margins of the bodies is adjusted automatically and in the same manner. As a result, the mixing ratio and the flow of at least two gases can be adjusted solely in a mechanical manner without a readjustment by further control elements being necessary. The perpendicularity between the first direction of movement, alongside which the two bodies are displaceable relative to each other, and the second direction of movement, alongside which the control element is displaceable relative to the bodies in a continuous manner, in connection with the fact that separate mechanical elements are provided for it, results in the advantage that the mixing of the gases occurs independently of metering (and vice versa), and that a precise linear proportionality of metering with respect to the mixed gases is guaranteed: in any position of the two bodies relative to each other the position of the control element always has a proportionally equal effect on the openings between the margins of the bodies. Here, due to the translational displacement of the control element it is also guaranteed that leakage flows of the gases during passing through the openings are effectively prevented.

According to an embodiment of the invention, the device for mixing of the gases are configured such that on a margin of the one body at least a rectangular projection and on a margin of the respective other body at least a rectangular recess is provided. Here, the recess alongside the margin is configured longer than the projection so that, if the bodies are in contact with one another with these margins, rectangular openings between the bodies can be formed for the respective gases. Such a configuration of the bodies on their margins, which are in contact with one another, for realization of the openings for the gases to be mixed, is equally mechanically simple and of high-precision: by displacement of the bodies alongside the first direction of movement one opening is decreased relative to its opening cross-section, and the other opening is automatically increased to the same extent in the process, wherein the resulting total cross-section of the openings remains constant. As has already been explained above, such a mixing of the gases occurs by displacement of the bodies relative to each other entirely independent from their metering and/or from the driving of the control element.

According to an embodiment of the invention, a base plate and a cover plate are provided for the device in which through-holes each are defined for the gases. Here, the bodies and the control element are arranged and/or received between the base plate and the cover plate, wherein the through-holes in the base plate and the cover plate are arranged in alignment with each other, and the openings, which can be formed between the margins of the bodies, are in fluid connection with the through-holes. Receiving of the bodies and the control element between the base plate and the cover plate guarantees a protected arrangement of these elements in the smallest installation space, wherein an appropriate fixation of the base plate and the cover plate with each other, e.g. by a screw connection, presses the control element advantageously against the bodies resulting in a high tightness.

According to an embodiment of the invention, a recess can be formed in a surface of the cover plate facing the control element, in which the control element is received and guided in a displaceable manner in the second direction of movement. Such an integration of a guide into said surface of the cover plate contributes to compact dimensions of the device according to the present invention in connection with a precise guiding of the control element in the second direction of movement.

Regarding the through-holes in the base plate it is pointed out that said through-holes are connected to supply lines for the gases to be mixed. In this way the gases to be mixed enter into the device through said supply lines and through the through-holes of the base plate. Subsequently, the gases enter through the rectangular openings between the margins of the bodies and are suitably mixed and metered there, as explained, depending on the free opening cross-section of said openings and depending on the position of the control element between its open and closed position. The through-holes formed in the cover plate are connected to a mixing chamber on the outside of the cover plate so that the gases, which are discharged from the device through the through-holes in the cover plate then get into such a mixing chamber, namely in a predetermined mixing ratio adjusted by the bodies and in a desired metering adjusted by the control element.

The bodies and/or the control element can be made from metal, e.g. from brass, so that these elements can be produced with high precision and in particular can also withstand high pressures of the gases. Alternatively, it is also possible to produce the bodies and/or the control element from plastic resulting in good sliding properties in interaction with the base plate and the cover plate for displacement of these elements in the first and/or second direction of movement. As another alternative it is possible to produce the bodies and/or the control element from ceramics advantageously resulting in low or no wear of these elements in connection with a very high service life.

The device according to the present invention is in principle suitable for mixing and metering of any number of gases, wherein the margins of the bodies, which are in contact with one another, depending on the number of gases to be mixed, are provided with an appropriate number of projections and recesses. The same applies to the number of through-holes, which are each formed in the base plate and in the cover plate, with which, as explained, the openings, which can be formed between the margins of the bodies depending on their relative position to each other, are in fluid connection.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 1.1 and 1.2 show a simplified exploded view of a device according to the present invention, namely in a diagonal view from above (FIG. 1.1) and in a diagonal view from below (FIG. 1.2);

FIGS. 2.1 and 2.2 show a top view on two bodies for use in the device of FIG. 1, each in contact with one another (FIG. 2.1) and isolated from each other for illustration purposes (FIG. 2.2);

FIGS. 4.1, 4.2, and 4.3 show cross-sectional views of the device of FIG. 1 according to the present invention, namely along the line A-A (FIG. 4.2) and along the line B-B (FIG. 4.3) with respect to the top view of FIG. 4.1;

FIGS. 5.1, 5.2, and 5.3 show different illustrations of the device of FIG. 1 according to the present invention viewed from below, wherein for showing of different mixing ratios the bodies of the device are arranged in different positions relative to one another;

FIGS. 6.1 and 6.2 show a partially cut-out perspective view of the device of FIG. 1 according to the present invention and a portion enlarged therefrom;

FIGS. 7.1, 7.2, 7.3, and 7.4 show different longitudinal sectional views of the device of FIG. 1 according to the present invention for showing different flows depending on a position of a control element respectively selected for this purpose;

FIGS. 8.1 and 8.2 show a simplified exploded view of a device of the present invention according to another embodiment, namely in a diagonal view from above (FIG. 8.1.) and in a diagonal view from below (FIG. 8.2);

FIGS. 9.1 and 9.2 shows a top view on two bodies for use in the device of FIG. 8, each in contact with one another (FIG. 9.1) and isolated from each other for illustration purposes (FIG. 9.2);

FIGS. 11.1, 11.2, and 11.3 show cross-sectional views of the device of FIG. 8 according to the present invention, namely along the line A-A (FIG. 11.2) and along the line B-B (FIG. 11.3) with respect to the top view of FIG. 11.1;

FIGS. 12.1, 12.2, and 12.3 show different illustrations of the device of FIG. 8 according to the present invention in a view from below, wherein for illustrating different mixing ratios the bodies of the device are arranged in different positions relative to one another;

FIGS. 13.1 and 13.2 shows a partially cut-out perspective view of the device of FIG. 8 according to the present invention and a portion enlarged therefrom; and FIGS. 14.1, 14.2, 143.3, and 14.4 show different longitudinal sectional views of the device of FIG. 8 according to the present invention for illustrating different flows depending on a position of a control element respectively selected for this purpose.

DETAILED DESCRIPTION

Figure 3:
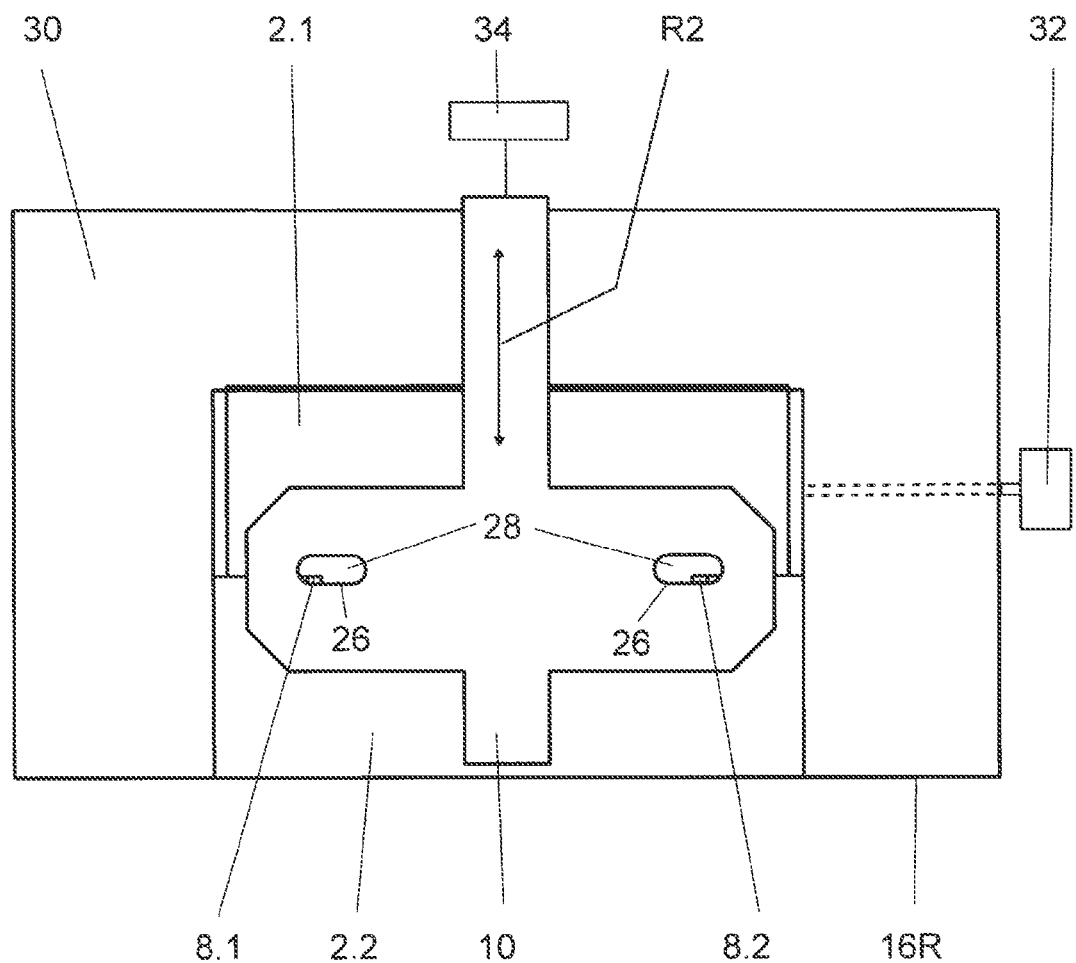
FIG. 3 shows a longitudinal sectional view of the device of FIG. 1 according to the present invention.
Figure 10:
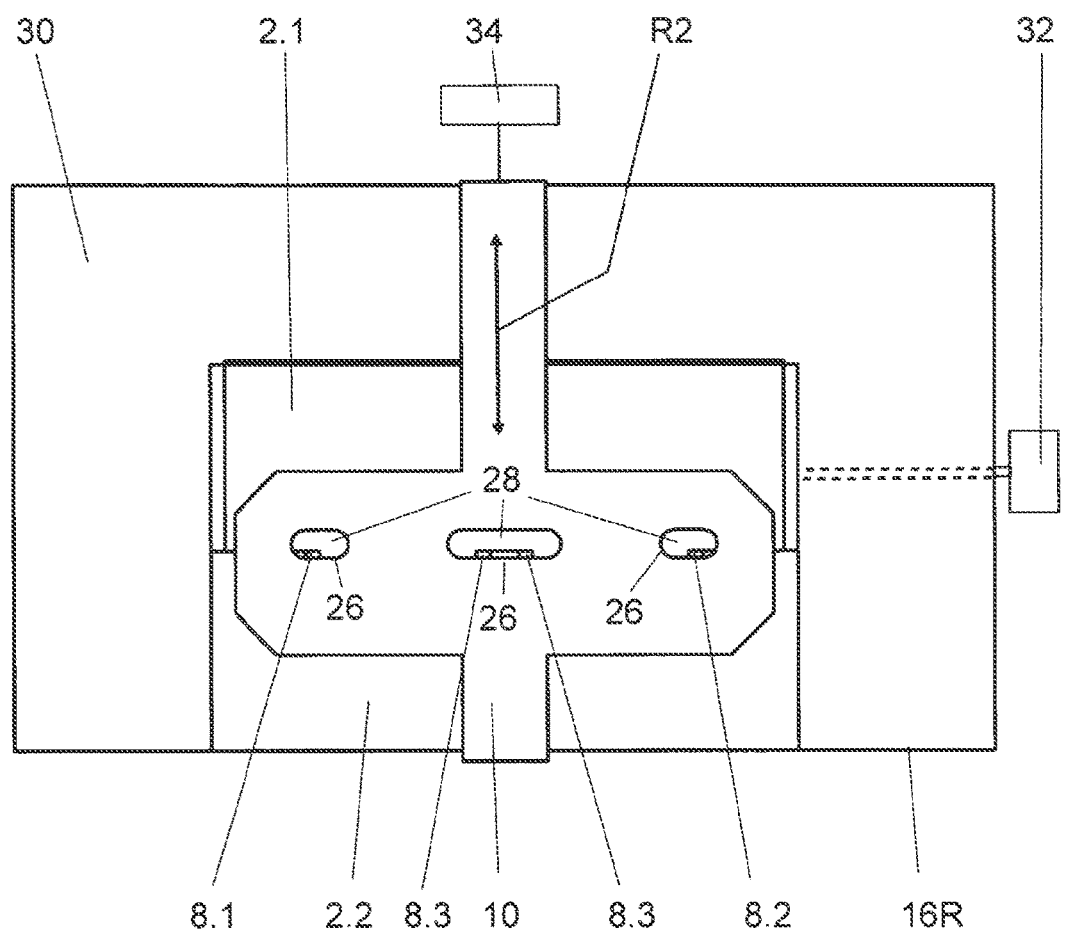
FIG. 10 shows a longitudinal sectional view of the device of FIG. 8 according to the present invention.

In FIG. 1-7, a first embodiment of a device 1 according to the present invention is shown which is provided for mixing and metering of two gases.

FIG. 1 shows in principle simplified perspective views of the device 1, namely in a diagonal view from above (cf. FIG. 1.1) and in a diagonal view from below (cf. FIG. 1.2). The device comprises two bodies 2 which can be displaced relative to each other in a first direction of movement R1. A control element 10 is arranged adjacent to the bodies 2 and in contact with the same. The control element 10 can be translationally displaced in a second direction of movement R2, wherein the second direction of movement R2 extends perpendicularly to the first direction of movement R1.

The bodies 2 and the control element 10 are received together with an additional body 30 between a base plate 16 and a cover plate 18. Here, the base plate 16 and the cover plate 18 are fastened to each other by screw connections. The additional body 30 has approximately the same height as the body 2. The additional body 30 is U-shaped so that it laterally encompasses the bodies 2 in mounted condition of the device 1. The purpose of this U-shaped configuration of the additional body 30 is still explained in detail below.

A recess 24 is formed on a surface 22 of the cover plate 18 facing the control element 10 in which the control element 10 is received and guided in a displaceable manner in the second direction of movement R2. Here, the depth of said recess 24 substantially corresponds to a height of the control element 2 so that the control element 10 can be inserted into the recess 24 approximately flatly.

Both in the base plate 16 and in the cover plate 18, through-holes 20 each are formed for the gases to be mixed and metered. In detail, each a first through-hole 20.1 and a second through-hole 20.2 is formed in the base plate 16 and in the cover plate 18, provided that in the case of the mounted device 1, each the first through-holes 20.1 and the second through-holes 20.2 are arranged in alignment with each other.

The configuration of the bodies 2 is explained below by means of FIG. 2.

The bodies 2 are configured in the form of longitudinal plates which are provided on a margin each with a rectangular projection and/or a rectangular recess. When the bodies 2 with said margins are brought into contact with each other, it is possible due to the rectangular projection and/or recess that between the margins of the bodies 2 rectangular openings 8 (cf. FIG. 2.1) are formed.

In case that the device 1 is mounted together, the two bodies 2 are placed on a surface 17 of the base plate 16. Here, a first body 2.1 is arranged on the surface 17 in a displaceable manner, namely in the first direction of movement R1. A second body 2.2 is arranged adjacent to a margin 16R of the base plate 16 and thereby fastened on the surface 17 of the base plate 16, e.g. by adhesives or screws.

As shown in FIG. 2.2, on a margin 4 of the first body 2.1 a rectangular projection 12 is formed. On a margin 6 of the second body 2.2 a rectangular recess 14 is formed. Here, the recess 14 along the margin 6 has a greater length than the projection 12. When the first body 2.1 and the second body 2.2 are brought into contact with their margins 4, 6 (cf. FIG. 2.1), due to the interaction of the projection 12 with the recess 14 and by a displacement of the first body 2.1 relative to the second body 2.2, it is possible in the direction of movement R1 that between the margins 4, 6 rectangular openings 8 are formed. With respect to said openings 8, it is pointed out that these are, e.g. allocated to a first gas G1 and a second gas G2 and are designated accordingly with 8.1 and 8.2.

In the case that the device 1 is mounted together, the bodies 2.1 and 2.2 are received between the base plate 16 and the cover plate 18 such that the opening 8.1 is in alignment with the first through-holes 20.1 and that the opening 8.2 is in alignment with the second through-holes 20.2.

At this point it is pointed out that the through-holes 20 are connected in the base plate 16 to supply lines for a first gas G1 and a second gas G2. In this way, the gases G1 and G2 are supplied to the device 1, preferably under a certain pressure. Due to the aligned arrangement of the openings 8.1, 8.2, which can be formed between the margins 4, 6 of the bodies 2.1, 2.2, with the through-holes 20 in the base plate 16 and the cover plate 18 it is possible that the gases G1, G2 are flowing from the base plate 16 in the direction of the cover plate 18 and there are flowing out again from the first and second through-holes 20.1, 20.2. This flow direction is symbolized by the arrow S in FIG. 1. The through-holes 20.1, 20.2 of the cover plate 18 are connected on their outside with a mixing chamber or the like into which the gases G1, G2 can flow. Starting from such a mixing chamber, subsequently the gases G1, G1 can be transferred, e.g. for administration to a patient or the like.

FIG. 3 shows a longitudinal sectional view through the device 1, wherein the cover plate 20 is not shown for reasons of simplification. The control element 10 comprises control edges 26 which are formed in respective windows 28 of the control element 10. Here, in a mounted device 1 the control element 10 is arranged between the base plate 16 and the cover plate 18 such that the windows 28 and thus also the control edges 26 mentioned can be brought to overlap the openings 8.1, 8.2, depending on a translational displacement of the control element 10 in the second direction of movement R2.

For activation of the first body 2.1, for the purpose of displacement in the first direction of movement R1 and relative to the second body 2.2, controller 32 (cf. FIG. 3) are provided, e.g. in the form of a rotary knob 32. By actuation of said rotary knob, the first body 2.1 can be displaced in the direction of movement R1 relative to the second body 2.2, which is fastened on the surface 17 of the base plate 16, in order to change thereby a cross-section of the openings 8 between the margins 4, 6 of the bodies 2 and thus the mixing ratio of the two gases G1, G2.

Moreover, controller 34 is provided which is shown in FIG. 3 in a greatly simplified symbolic manner. Said controller 34 is in operative connection with the control element 10 and permit a translational displacement of the control element 10 along the second direction of movement R2.

With respect to the controller 32, 34, it is pointed out that they can be actuated from an outside of the device 1. If the device 1 is an integral part of another apparatus or is integrated into such a unit, it is understood that the controller 32, 34, e.g. can be arranged on a control panel or the like in order to drive from there the first body 2.1 and the control element 10 in a desired manner.

FIG. 4.1 shows a top view on the mounted device 1, wherein FIGS. 4.2 and 4.3 each show cross-sectional views through the device of 4.1 in order to illustrate the displaceability of the first body 2.1 in the first direction of movement R1 and the control element 10 in the second direction of movement R2. In detail, FIG. 4.2 shows a cross-sectional view along line A-A of FIG. 4.1 and FIG. 4.3 shows a cross-sectional view along line B-B of FIG. 4.1. These cross-sectional views illustrate in particular again the alignment of the first through-holes 20.1 and the second through-holes 20.2, wherein the openings 8 are in fluid connection with these through-holes.

Moreover, it is pointed out that the bodies 2.1, 2.2 in the mounted device 1 are arranged next to each other in a common plane E (cf. FIG. 4.3) extending vertically to the flow direction S of the gases G1, G2. Here, the control element 10 is then placed directly onto the bodies 2.1, 2.2 so that its control edge 26 can get into interaction with the opening(s) 8.

Fastening of the base plate 16 and the cover plate 18 with one another occurs such that a sufficiently large surface pressure is applied on the bodies 2 received in between and the control element 10 in order to prevent leakage flows of the gases G1, G2. For this purpose, also the U-shaped configuration of the additional body 30 is advantageous which laterally encompasses the bodies 2. Regarding the surface pressure just mentioned it has to be observed that here always a mobility of the first body 2 in the first direction of movement R1 and the control element 10 in the second direction of movement R2 is maintained.

The mixing of two gases G1, G2 by means of the device 1 of FIG. 1 is illustrated in FIG. 5, wherein the individual FIGS. 5.1-5.3 each—in the left part of the figure—show views from below on the base plate 16, and—in the right part of the figure—an enlargement of section I of the left part of the figure.

FIG. 5.1 illustrates a position of the first body 2.1 relative to the second body, wherein between the margins 4, 6 only one opening 8 is formed, namely in alignment with the two through-holes 20.2. Consequently, only the second gas G2 is lead through the device 1, wherein a flow for the first gas G1 is blocked. In other words, the mixing ratio between the first gas G1 and the second gas G2 is 0%/100%.

According to the illustration in FIG. 5.2, the first body 2.1 is displaced relative to the second body 2.2 along the first direction of movement R1 such that between the margins 4, 6 of the bodies 2 two openings 8 are formed comprising a cross-section of the same size. Consequently, the first and second gas G1, G2 can flow through the respective first and second through-holes 20.1, 20.2, wherein the mixing ratio of these two gases G1, G2 is the same, and thus is 50%/50%.

Different from the illustration in FIG. 5.2, it is understood that the first body 2.1 can also be displaced relative to the second body 2.2 along the first direction of movement R1 such that the two openings 8 do not have the same size, and accordingly the mixing ratio of the two gases G1, G2 of 50%/50% is different. The first body 2.1 can be displaced relative to the second body 2.2 continuously in any position in order to adjust by it any mixing ratio for the two gases G1, G2 in the range between 0% and 100%.

In FIG. 5.3 a reversal of the situation of FIG. 5.1 is shown where the first body 2.1 is displaced in its opposite edge position with the result that between the margins 4, 6 of the bodies 2 only one opening 8 is formed which is in alignment with the first through-holes 20.1. Accordingly, only the first gas G1 is lead through the device 1, whereas the flow for the second gas G2 is blocked. Accordingly, the mixing ratio of the first gas G1 compared with the second gas G2 at the position of FIG. 5.3 is 100%/0%.

The metering of the gases G1, G2 in the device 1 of FIG. 2 by means of the control element 10 is subsequently explained in detail by means of FIGS. 6 and 7.

FIG. 6 shows in its illustration 6.1 a partly cut-out perspective view of the device 1 in mounted condition. The portion II of FIG. 6.1 is shown enlarged again in the illustration of FIG. 6.2. It can be seen that the control edge 26 of the window 28, which is formed in the control element 10, can be caused to overlap an opening 8 formed between the margins 4, 6 of the bodies 2. Accordingly, a position of the control element 10 relative to the bodies 2 then determines the free cross-section of said opening 8 in order to thus control a gas flow through said opening 8.

FIG. 7 illustrates a displacement of the control element 10 between a closed position (cf. FIG. 7.1) and an open position (cf. FIG. 7.4) for metering of the gases G1, G2. FIG. 7 illustrates various positions of the control element 10 relative to the bodies 2 for adjustment of different flow rates for the gases G1, G2. In detail, the illustrations 7.1-7.4 of FIG. 7 show—in the left area of the figure in each case—a longitudinal sectional view of the device 1 in analogy to FIG. 3, and—in the right area of the figure in each case—an enlargement of portion III of the left area of the figure for illustration of the interaction of the control edge 26 with the opening 8 below.

In the position of FIG. 7.1, the control element 10 is in its closed position. Accordingly, the opening 8 is entirely covered by the control edge 26 of the control element 10, and thus closed. Accordingly, the flow through the device 1 for the gases G1, G2 is blocked and/or is 0%.

According to the positions of FIGS. 7.2 and 7.3, the control element 10 relative to the bodies 2 is positioned such that the opening 8 is partly vacated by the control edge 26. In detail, the opening 8 is vacated by half by the control edge 26 (cf. FIG. 7.2 with a flow of 50%) oder vacated by three-quarter (cf. FIG. 7.3, with a flow of 75%). According to the position of FIG. 7.4, the control element 10 is in its open position. Here, the control element 10 along its second direction of movement R2 is displaced in such a manner relative to the bodies 2 that the opening 8 formed between the margins 4, 6 of the bodies 2 is entirely open. Hence, the flow for the gases G1, G2 through the device 1 is 100%.

It is pointed out here again that the translational displacement of the control element 10 in the second direction of movement R2 and thus the position of its control edge 26 always affects the openings 8 in the same way which can be formed between the margins 4, 6 of the two bodies 2.1, 2.2. By this, always the same metering for the gases G1, G2 is guaranteed irrespective of the mixing ratio adjusted for it.

In FIG. 8-14 a second embodiment of the device 1 according to the present invention is shown which is provided for mixing and metering of three gases.

The device 1 according to the second embodiment corresponds from its functional principle regarding mixing and metering of the gases to the first embodiment according to FIG. 1-8. Insofar as component parts of the second embodiment correspond to the component parts of the first embodiment, the same reference numerals are used for it. Moreover, it is pointed out that the illustrations of the second embodiment in the FIGS. 8-15—namely in this order—correspond to the illustrations of the first embodiment in FIGS. 1-7—likewise in this order so that to avoid repetitions here reference is made to the above explanations regarding FIGS. 1-7.

The second embodiment differs from the first embodiment in that mixing of three gases G1, G2 and G3 is possible here. Accordingly, in the base plate 16 and in the cover plate 18 apart from the first and second through-holes 20.1, 20.2 also third through-holes 20.3 (cf. FIG. 8) are formed. In the mounted device 1, these third through-holes 20.3 are also arranged in alignment with each other.

Another difference compared with the first embodiment is that according to the illustration in FIG. 9 in the second embodiment on the margin 4 of the first body 2.1 two rectangular projections 12 are formed and that on the margin 6 of the second body 2.2 two rectangular recesses 14 are formed. Here, the recesses 14 along the margin 6 each have a greater length than the rectangular projections 21 on the margin 4 of the first body 2.1.

The isolated illustration of the bodies 2.1, 2.2 in FIG. 9.2 illustrates that on the margin 4 of the first body 2.1 a central, rectangular recess 13 is formed, namely between the projections 12, and that on the margin 6 of the second body 2.2 a central, rectangular projection 15 is formed, namely between the recesses 14.

If the first body 2.1 and the second body 2.2 with their margins 4, 6 are brought into contact with one another (cf. FIG. 9.1), several openings can be formed between these margins 4, 6, namely the opening 8.1, the opening 8.2 and the opening 8.3 located in-between. In this context it is pointed out that the opening 8.1 is allocated to a first gas G1, opening 8.2 to a second gas G2 and opening 8.3 to a third gas G3. Accordingly, the bodies 2.1, 2.2 are received between the base plate 16 and the cover plate 18 such that the opening 8.3 is in fluid connection with the third through-holes 20.3, wherein the openings 8.1 and 8.2—in the same way and unchanged as in the first embodiment—are in fluid connection with the first through-holes 20.1 and/or the second through-holes 20.2.

The opening 8.3 retains in each position of the first body 2.1 relative to the second body 2.2 a constant flow area and by the central, rectangular projection 15, which projects into the recess 13, is subdivided into "two windows" depending on the position of the first body 2.1. Nevertheless, it is to be understood that these two windows of the opening 8.3 are each in fluid connection with the third through-holes 20.3 in the base plate 16 and the cover plate 18, and thus the third gas G3 is flowing through both.

In adjustment to the third opening 8.3, which is formed between the margins 4, 6 of the bodies 2, another window 28 is also formed in the control element 10, namely in its central portion. In the same way as for the two external windows 28, a control edge 26 is formed on an edge of the central window 28 which in the case of a corresponding positioning of the control element 10 relative to the bodies 2 can be caused to overlap the opening 8.3. This is, e.g. made clear in FIG. 10.

In the same way as in FIG. 5, FIG. 12 illustrates mixing of the gases G1, G2, G3 for the second embodiment of FIG. 8. In this respect, it is pointed out that the mixing amount of the third gas G3, which is lead through the opening 8.3, remains always unchanged, and is 100%. As explained above, displacement of the first body 2.1 relative to the second body 2.2 and thus also displacement of the projection 15 within the recess 13 does not affect the effective opening cross-section for opening 8.3. In contrast, displacement of the first body 2.1 along the first direction of movement R1 affects an effective opening cross-section of the first opening 8.1 and the second opening 8.3. In the position according to FIG. 12.1 the opening 8.1 is entirely closed so that the gas G3 is exclusively mixed with the gas G2, namely in the mixing ratio 1:1. Conversely, the first body 2.1, according to the position of FIG. 12.3, relative to the second body 2.2 is displaced such that the opening 8.2 is entirely closed and the opening 8.1 entirely opened. Accordingly, the third gas G3 is exclusively mixed with the first gas G1, namely in a mixing ratio of 1:1. According to the position of the first body 2.1 pursuant to FIG. 12,2, the third gas G3 can also both be mixed with the first gas G1 and the second gas G2, e.g. as is shown in FIG. 12.2, wherein then the gases G1, G2 and G3 are mixed in a mixing ratio 1:2:1. In other words, here the first gas G1 and the second gas G2 are added to the third gas G3 each in a ratio of 50%.

Contrary to the embodiment of FIG. 12.2, it is pointed out that the mixing ratios for the first gas G1 and the second gas G2, which is achieved by a corresponding displacement of the first body 2.1 along the first direction of movement R1, can be adjusted to any values between 0% and 100%, e.g. to 25% for the first gas G1 and 75% for the second gas G2. In general, for addition of the gases G1 and G2 to the gas G3, it is pointed out that the lower the value for the first gas G1 is adjusted, the greater the mixing amount for the second gas G2 will be, and vice-versa. Here, the mixing amount for the third gas G3 remains constant in each case.

The metering of the gases G1-G3 in the second embodiment of the device 1 occurs by means of the control element 10 according to the same principle as in the first embodiment, and is illustrated in FIGS. 13 and 14. The control edges 26, which are formed in the windows 28 of the control element 10, affect the openings 8, which are formed between the edges 4, 6 of the bodies 2 always in the same way (cf. FIG. 13.2).

For both of the above embodiments (according to FIG. 1 and FIG. 8), it is pointed out again for clarification that mixing of the gases occurs by displacement of the bodies 2.1 and 2.2 relative to each other along the first direction of movement R1, wherein metering of the gases occurs by displacement of the control element 10 along the direction of movement R2.

It is also pointed out for both embodiment of the device 1 that their elements are preferably made of materials which do not show any interaction with the gases G1, G2 and G3 or are provided with corresponding coatings for the same purpose. The control element 10 is preferably made of plastic whereby good sliding properties with respect to the bodies 2 and/or the cover plate 18 are guaranteed. The bodies 2 can be made of brass.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for mixing and metering of at least two gases, comprising a component that can be displaced, wherein a direction of movement of the component for mixing of the gases and a direction of movement of a device for metering of the gases are vertical to each other, the device comprising:

two bodies for mixing the gases, the two bodies being displaced relative to each other, and are arranged next to each other in a common plane extending vertically to the flow direction of the gases, wherein margins of the bodies are in contact with one another and between these margins at least two rectangular openings for one gas each can be formed, wherein a displacement of the two bodies relative to each other in a first direction of movement parallel to their margins automatically causes an increase of one opening and a decrease of the other opening, and the resulting total cross-section of the openings remains substantially constant; and a control element for metering of the gases, the control element being arranged adjacent to the two bodies and in contact therewith, wherein the control element in a second direction of movement vertically to the first direction of movement between a closed position, in which the openings, which can be formed between the margins of the bodies, are entirely covered by the control element and thus closed, and an open position, in which the openings, which can be formed between the margins of the bodies, are entirely opened, can be translationally displaced in a continuous manner.

2. The device according to claim 1, wherein the two bodies for mixing of the gases are configured such that on a margin of one body at least a rectangular projection and on a margin of the respective other body at least a rectangular recess is provided, wherein the recess alongside the margin is longer than the projection so that, if the bodies are in contact with one another with these margins, rectangular openings between the bodies are formed for the respective gases.

3. The device according to claim 1, wherein a base plate and a cover plate are provided in which through-holes each are defined for the gases, wherein the bodies and the control element are arranged between the base plate and the cover plate, wherein the through-holes in the base plate and the cover plate are arranged in alignment with each other, and the openings, which are formed between the margins of the bodies, are in fluid connection with the through-holes.

4. The device according to claim 3, wherein in a surface of the cover plate facing the control element a recess is formed in which the control element is received and guided in a displaceable manner in the second direction of movement.

5. The device according to claim 1, wherein the control element comprises a control edge, wherein in a translational displacement of the control element in the second direction of movement the control edge gets into interaction with the openings, which are formed between the margins of the bodies in order to change the free cross-section of the openings and thus to meter the gases and/or to control the gas flow through the openings.

6. The device according to claim 5, wherein the control edge is formed on a margin of the control element or on an edge of a window formed in the control element.

7. The device according to claim 2, wherein the bodies for mixing of the two gases are configured such that on the margin of the one body precisely one rectangular projection and on the margin of the respective other body at least a rectangular recess is provided so that between the margins of the bodies, namely in the two end regions of the rectangular recess—depending on the position of the two bodies relative to each other—one opening each are formed, wherein these two openings are each allocated to a first gas or a second gas.

8. The device according to claim 7, wherein in the base plate and in the cover plate each a first through-hole for passing the first gas and a second through-hole for passing the second gas are formed, wherein the first through-holes and the second through-holes each of the base and cover plate are arranged in alignment with each other, and here the openings, which are formed between the margins of the bodies, are in fluid connection with the first through-holes and/or the second through-holes.

9. The device according to claim 2, wherein the bodies are formed for mixing of three gases such that on the margin of the one body precisely two rectangular projections and in-between a central rectangular recess are formed and on the margin of the respective other body precisely two external recesses and in-between a central rectangular projection are formed so that between the margins of the bodies, namely in the two external end regions of the external recesses depending on the position of the two bodies relative to each other—one opening each are formed, which is allocated to a first gas or a second gas, wherein the opening, which is formed between the margins of the bodies in the area of the central recess and the central projection, is allocated to a third gas.

10. The device according to claim 9, wherein in the base plate and in the cover plate externally each a first through-hole for passing the first gas and a second through-hole for passing the second gas is formed, and in-between a third through-hole each for passing a third gas is formed, wherein the first, second and/or third through-holes of the base and cover plate are arranged in alignment with each other, wherein the openings, which are formed between the margins of the bodies in the two external end regions of the external recesses are in fluid connection with the first through-holes and/or the second through-holes, wherein the opening, which is formed between the margins of the bodies in the area of the central recess and the central projection, is in fluid connection with the third through-holes.

11. The device according to claim 1, wherein one of the two bodies, which is arranged adjacent to a margin of the base plate, is fastened on a surface of the base plate by adhesives or screws, wherein the other body in each case is guided in a displaceable manner on the surface of the base plate.

12. The device according to claim 3, wherein between the base plate and the cover plate an additional body is received, which has approximately the same height as the two bodies and is adjacent to the displaceable body, and wherein the additional body is U-shaped and laterally encompasses the bodies.

13. The device according to claim 1, wherein controller is provided via which the displaceable body and the control element are driven from an outside of the device, wherein the controller is formed by rotary knobs the rotation of which are transferred by allocated wedge faces into a linear movement for the displaceable body and/or the control element.

14. The device according to claim 1, wherein the body, the control element, the base plate, the cover plate and/or the additional body are made of materials and/or are provided with coatings which are non-reactive in interaction with the gases.

15. The device according to claim 1, wherein the bodies and/or the control element are made of brass, plastic or ceramics.

* * * * *